(12) United States Patent
Hendrickson

(10) Patent No.: US 8,024,920 B2
(45) Date of Patent: Sep. 27, 2011

(54) METHOD OF MONITORING A DOSING AGENT SUPPLY FOR TREATING EXHAUST

(75) Inventor: Brent D. Hendrickson, Northville, MI (US)

(73) Assignee: GM Global Technology Operations LLC

( * ) Notice: Subject to any disclaimer, the term of this patent is extended or adjusted under 35 U.S.C. 154(b) by 1062 days.

(21) Appl. No.: 11/639,369

(22) Filed: Dec. 14, 2006

(65) Prior Publication Data

US 2007/0277508 A1 Dec. 6, 2007

Related U.S. Application Data

(60) Provisional application No. 60/809,315, filed on May 30, 2006.

(51) Int. Cl.
*F01N 3/00* (2006.01)
(52) U.S. Cl. ............... 60/285; 60/274; 60/286; 60/295; 60/301
(58) Field of Classification Search ............ 60/284–287, 60/299–301
See application file for complete search history.

(56) References Cited

U.S. PATENT DOCUMENTS

| 6,502,390 | B2 * | 1/2003 | Goerigk et al. | 60/286 |
|---|---|---|---|---|
| 7,207,318 | B2 * | 4/2007 | Lepperhoff et al. | 123/438 |
| 2006/0179830 | A1 * | 8/2006 | Kamon et al. | 60/431 |
| 2006/0184307 | A1 * | 8/2006 | Kosaka | 701/110 |
| 2008/0110158 | A1 * | 5/2008 | Esaka | 60/286 |

FOREIGN PATENT DOCUMENTS

| DE | 4425018 | 6/1995 |
|---|---|---|
| DE | 10161449 | 6/2003 |
| DE | 10357120 | 7/2005 |

* cited by examiner

*Primary Examiner* — Thomas Denion
*Assistant Examiner* — Jesse Bogue

(57) ABSTRACT

An exhaust after-treatment system for a vehicle including a dosing agent that is selectively injected into an exhaust from a dosing agent supply includes a first module that determines a level of a dosing agent source and a second module that determines whether the vehicle is at a convenient location for replenishing the dosing agent source. A third module selectively inhibits vehicle operation if the level of the dosing agent source is below a threshold level and the vehicle is at the convenient location.

21 Claims, 4 Drawing Sheets

METHOD OF MONITORING A DOSING AGENT SUPPLY FOR TREATING EXHAUST

CROSS-REFERENCE TO RELATED APPLICATIONS

This application claims the benefit of U.S. Provisional Application No. 60/809,315, filed on May 30, 2006. This application is related to U.S. Ser. No. 11/639,370, filed on Dec. 14, 2006 (GP-308227-PTE-CD), entitled, "Diesel Exhaust Control During Limp-Home Mode", and U.S. Ser. No. 11/639,397, filed on Dec. 14, 2006 (GP-308075-PTE-CD), entitled, "Emissions Conformance For An Exhaust After-Treatment System Having A Dosing Agent Supply". The disclosures of the above applications are incorporated herein by reference.

FIELD OF THE INVENTION

The present invention relates to vehicle exhaust systems, and more particularly to a method of monitoring a dosing agent supply for treating exhaust of an engine.

BACKGROUND OF THE INVENTION

Internal combustion engines combust an air and fuel mixture to generate drive torque. The combustion process generates exhaust that is exhausted from the engine to atmosphere. The exhaust contains nitrogen oxides (NOx), carbon dioxide ($CO_2$) and carbon monoxide (CO) particulates. An exhaust after-treatment system treats the exhaust to reduce emissions prior to being released to atmosphere.

In an exemplary exhaust after-treatment system, a dosing system injects a dosing agent (e.g., urea) into the exhaust upstream of a catalyst. The exhaust and dosing agent mixture reacts over the catalyst to reduce the level of emissions. The dosing system includes a dosing agent supply and an injector. The amount of dosing agent injected is based on the level of emissions in the exhaust. If the dosing agent supply is empty or at a low level, insufficient dosing agent is injected into the exhaust stream and emissions are not reduced as desired.

SUMMARY OF THE INVENTION

Accordingly, the present invention provides an exhaust after-treatment system for a vehicle including a dosing agent that is selectively injected into an exhaust from a dosing agent supply. The exhaust after-treatment system includes a first module that determines a level of a dosing agent source and a second module that determines whether the vehicle is at a convenient location for replenishing the dosing agent source. A third module selectively inhibits vehicle operation if the level of the dosing agent source is below a threshold level and the vehicle is at the convenient location.

In one feature, the threshold level corresponds to an empty dosing agent source.

In another feature, the vehicle operation is inhibited by rendering the vehicle unable to drive.

In another feature, the vehicle operation is inhibited by limiting drivability of the vehicle.

In another feature, the third module discontinues inhibiting vehicle operation when the dosing agent source is replenished to raise the level above the threshold level.

In another feature, the second module monitors at least one of a fuel level, an oil parameter and a maintenance flag of the vehicle to determine whether the vehicle is at the convenient location.

In still another feature, the exhaust after-treatment system further includes a fourth module that indicates the level of the dosing agent source to alert a vehicle operator.

In yet another feature, the exhaust after-treatment system further includes a fourth module that determines a range of the vehicle based on the level. The range indicates a distance that is travelable by the vehicle before the level is below the threshold level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
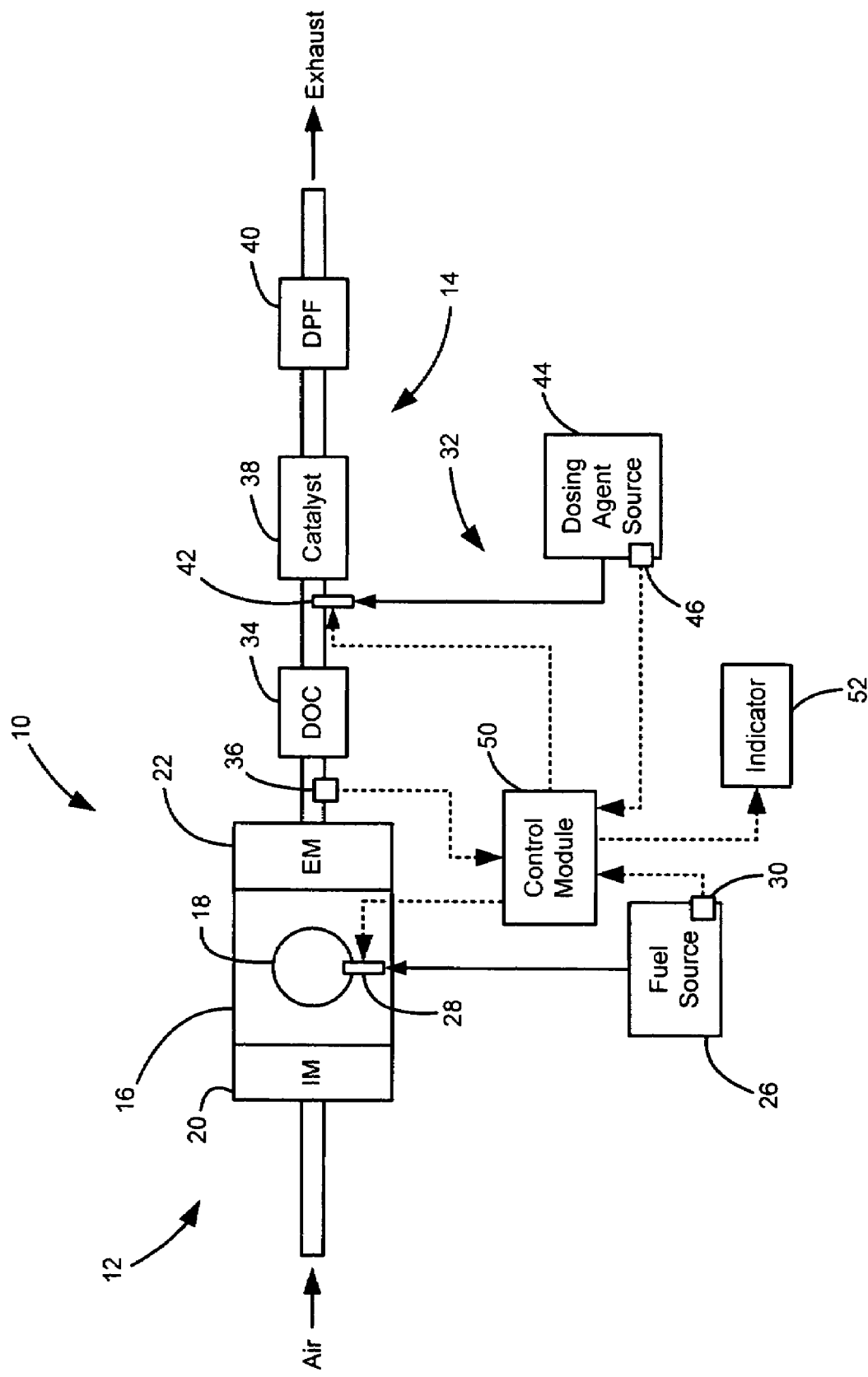
FIG. 1 is a functional block diagram of an exemplary vehicle system including an exhaust after-treatment system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle system 10 is schematically illustrated. The vehicle system 10 includes an engine system 12, an exhaust after-treatment system 14. The engine system 12 includes an engine 16 having a cylinder 18, an intake manifold 20 and an exhaust manifold 22. Air flows into the intake manifold and is mixed with fuel. The air and fuel mixture is combusted within the cylinder 18 to drive a piston (not shown). Although a single cylinder 18 is illustrated, it is appreciated that the engine 12 may include additional cylinders 18. For example, engines having 2, 3, 4, 5, 6, 8, 10, 12 and 16 cylinders are anticipated. The fuel is provided from a fuel source 26 and is injected into the air stream using an injector 28. A fuel level sensor 30 is responsive to the amount of fuel within the fuel source 26.

Exhaust is produced through the combustion process and is exhausted from the cylinder 18 into the exhaust manifold 22. The exhaust after-treatment system 14 treats the exhaust flowing therethrough to reduce emissions before being released to the atmosphere. The exhaust after-treatment system 14 includes a dosing system 32, a diesel oxidation catalyst (DOC) 34, an emissions sensor 36 and a catalyst 38 that is preferably provided as a selective catalytic (SCR) catalyst.

The DOC 34 reacts with the exhaust to reduce emission levels of the exhaust. The emissions sensor 36 is responsive to an emissions (e.g., NOx) level of the exhaust. It is also anticipated that a diesel particulate filter (DPF) 40 may be located downstream from the catalyst 30 that filters diesel particulates to further reduce emissions.

The dosing system 32 includes a dosing agent injector 42, a dosing agent storage tank 44 and a dosing agent supply sensor 46. The dosing system 32 selectively injects a dosing agent (e.g., urea) into the exhaust stream to further reduce emissions. More specifically, the amount of the dosing agent injected is determined based on various parameters, for example, by using a model-based approach. The signal generated by the exhaust sensor provides a feedback parameter that can be used to monitor the accuracy of the calculated dosing agent amount and/or to check that the dosing agent properties are correct. The exhaust and dosing agent mixture reacts within the catalyst 38 to further reduce exhaust emissions.

A control module 50 regulates operation of the vehicle system 10 based on the dosing agent monitoring control of the present invention. More specifically, the control module 50 determines a dosing agent level ($DA_{LEVEL}$) based on the signal generated by the dosing agent supply sensor 46. The control module can calculate a vehicle range ($RANGE_{DA}$) based on the amount of dosing agent remaining. More specifically, $RANGE_{DA}$ indicates the remaining drivable distance before the entire dosing agent is consumed. $RANGE_{DA}$ can be displayed on a display (not shown) to alert the vehicle operator.

If $DA_{LEVEL}$ is below a first predetermined or low dosing agent threshold value ($DA_{LOW}$), the control module 50 sets a low dosing agent flag ($FLAG_{DALOW}$) (e.g., equal to 1 or TRUE) indicating that the dosing agent level is low and should be refilled. Additionally, the control module 50 activates an indicator 52 that alerts the vehicle operator that the dosing agent supply is low and should be refilled. The indicator 52 can be a visual and/or audible indication that alerts the vehicle operator to the low condition. If $DA_{LEVEL}$ is below a second predetermined or empty dosing agent threshold value ($DA_{EMPTY}$), the control module 50 sets an empty dosing agent flag ($FLAG_{DAEMPTY}$) (e.g., equal to 1 or TRUE). Further, the control module 50 activates the indicator 52 to indicate that the dosing agent source 44 is empty. When the dosing agent source 44 is refilled and $DA_{LEVEL}$ exceeds $DA_{EMPTY}$ and/or $DA_{LOW}$, $FLAG_{DAEMPTY}$ and/or $FLAG_{DALOW}$ is/are cleared and the indicator 52 is also cleared.

The dosing agent monitoring control selectively impedes vehicle operation when the dosing agent is empty. More specifically, if $FLAG_{DAEMPTY}$ is set and the vehicle is stopped at a convenient location (i.e., a location where additional dosing agent is likely to be available) the dosing agent monitoring control inhibits operation of the vehicle by setting a disable flag ($FLAG_{DIS}$) until the dosing agent is replenished. Operation of the vehicle can be impeded by either rendering the vehicle not drivable (e.g., preventing engine start or crank) or by limiting the drivability of the vehicle (e.g., a limp-home mode). If the dosing agent monitoring control determines that the vehicle is at a convenient location, a convenient location flag ($FLAG_{CL}$) is set (e.g., equal to 1 or TRUE). A convenient location can include, but is not limited to, a fuel station, a maintenance workshop and/or an oil change workshop.

For example, the dosing agent monitoring control can monitor a fuel level before and after the vehicle is stopped. If the fuel level has increased, the dosing agent monitoring control determines that the vehicle was stopped to refuel and is therefore at a convenient location (i.e., fueling station) where additional dosing agent is available. Similarly, the dosing agent monitoring control can monitor either an oil level or an oil parameter (e.g., an electrical property such as impedance) to determine whether an oil change has occurred. If so, the dosing agent monitoring control determines that the vehicle was stopped for an oil change and is therefore at a convenient location (i.e., oil change workshop) where additional dosing agent is available. Alternatively, the dosing agent monitoring control can monitor vehicle maintenance flags in memory that are reset immediately after a maintenance event has occurred. In this manner, the dosing agent monitoring control can identify when the vehicle is in a maintenance workshop and can impede vehicle operation until the dosing agent is replenished.

Although the dosing agent monitoring control is described in further detail below using the fueling station scenario as an example, it is appreciated that the dosing agent monitoring control can monitor any of the above-described scenarios to determine whether the vehicle is located in a convenient location.

Figure 2:
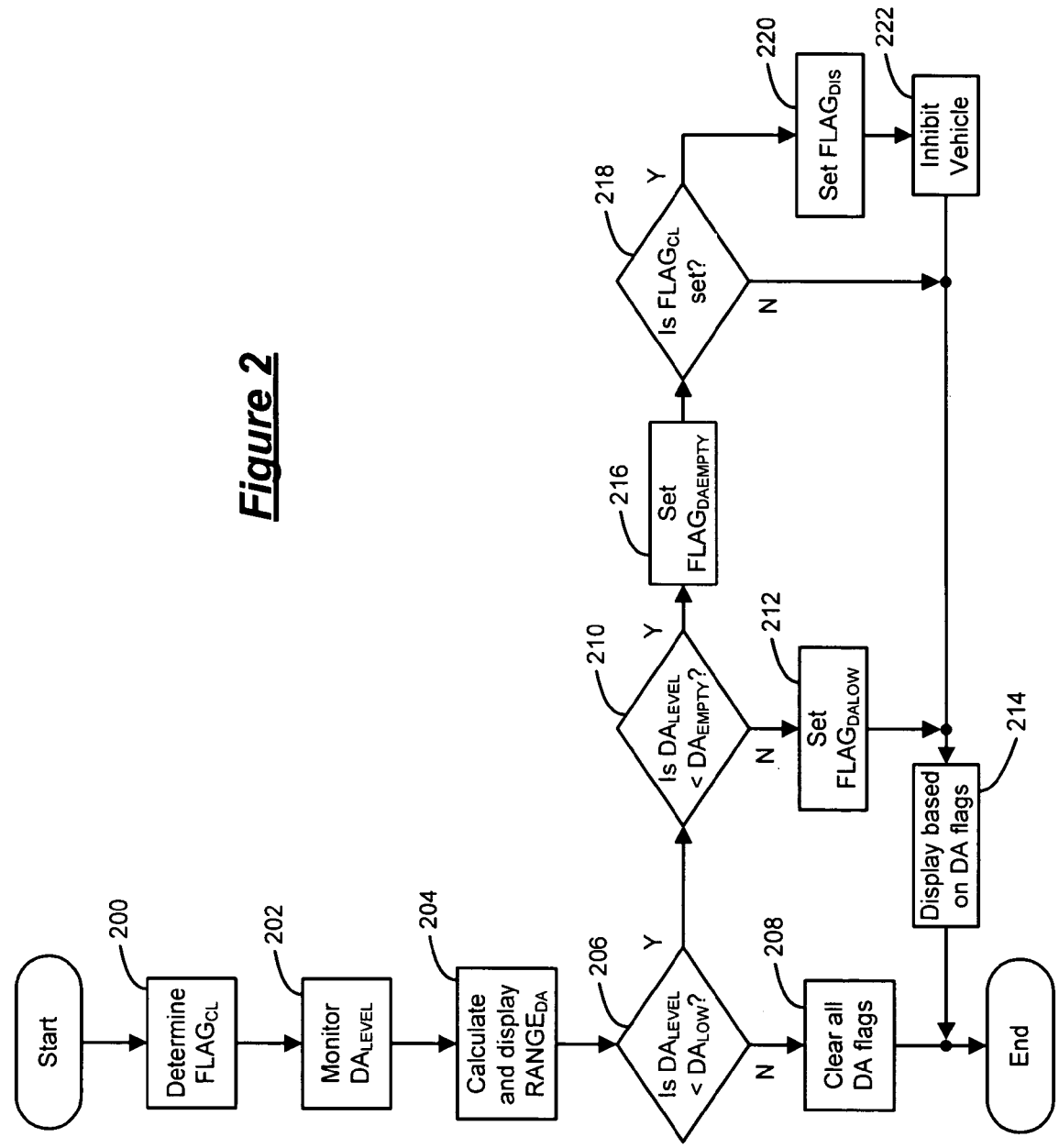
FIG. 2 is a flowchart illustrating exemplary steps executed by the dosing agent monitoring control of the present invention.

Referring now to FIG. 2, exemplary steps executed by the dosing agent monitoring control will be described in detail. In step 200, control determines $FLAG_{CL}$. An exemplary determination of $FLAG_{CL}$ is described in further detail below with regard to FIG. 3. In step 202, control monitors $DA_{LEVEL}$. Control calculates and displays $RANG_{DA}$ in step 204 based on $DA_{LEVEL}$.

In step 206, control determines whether $DA_{LEVEL}$ is less than $DA_{LOW}$. If $DA_{LEVEL}$ is not less than $DA_{LOW}$, control clears al dosing agent related flags in step 208 and control ends. If $DA_{LEVEL}$ is less than $DA_{LOW}$, control determines whether $DA_{LEVEL}$ is less than $DA_{EMPTY}$ in step 210. If $DA_{LEVEL}$ is not less than $DA_{EMPTY}$, control sets $FLAG_{DALOW}$ in step 212 and control continues in step 214. If $DA_{LEVEL}$ is less than $DA_{EMPTY}$, control sets $FLAG_{DAEMPTY}$ in step 216 and control continues in step 218.

In step 218, control determines whether $FLAG_{CL}$ is set. If $FLAG_{CL}$ is not set, control continues in step 214. If $FLAG_{CL}$ is set, control sets $FLAG_{DIS}$ in step 220. Control inhibits vehicle operation in step 222 and continues in step 214. In step 214, control displays the dosing agent status based on the dosing agent related flags and control ends. For example, "Dosing Agent Low", "Dosing Agent Empty" or "Vehicle Disable Due To Empty Dosing Agent" messages can be displayed.

Figure 3:
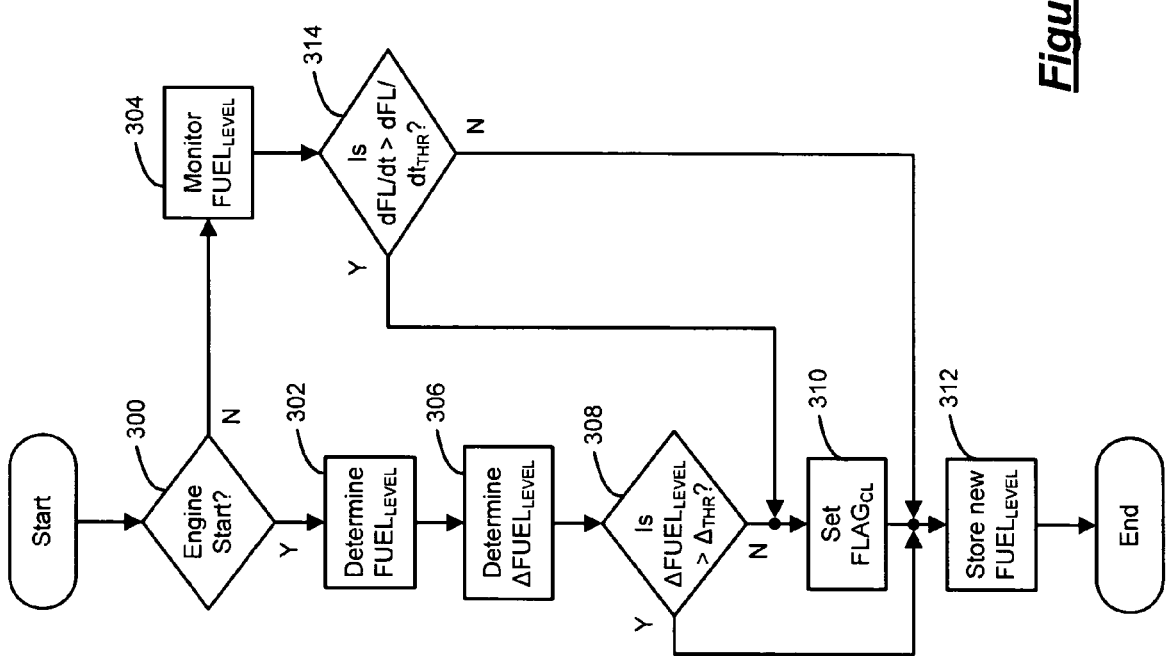
FIG. 3 is a flowchart illustrating exemplary steps executed by dosing agent monitoring control to determine whether the vehicle system is stopped at a convenient location.

Referring now to FIG. 3, exemplary steps executed by the dosing agent monitoring control to determine whether the vehicle is stopped at a convenient location will be described in detail. In step 300, control determines whether an engine start just occurred. If an engine start occurred, control continues in step 302. If an engine start did not occur, control continues in step 304.

In step 302, control determines $FUEL_{LEVEL}$. In step 306, control determines $\Delta FUEL_{LEVEL}$ as the difference between $FUEL_{LEVEL}$ and the fuel level that was stored in memory immediately prior to the last engine shut-off event. In step 308, control determines whether $\Delta FUEL_{LEVEL}$ is greater than a threshold difference ($\Delta_{THR}$). If $\Delta FUEL_{LEVEL}$ is greater than $\Delta_{THR}$, control determines that the vehicle was refueled during the most recent shut-down and continues in step 310. If $\Delta FUEL_{LEVEL}$ is not greater than $\Delta_{THR}$, control determines that the vehicle was not refueled during the most recent shut-down and continues in step 312.

In step 304, control continuously monitors $FUEL_{LEVEL}$. In step 314, control determines whether $FUEL_{LEVEL}$ is increasing at a rate (e.g., dFL/dt) greater than a threshold rate (e.g., dFL/dt$_{THR}$). If dFL/dt is greater than dFL/dt$_{THR}$, control determines that the vehicle is being refueled and continues in step 310. If dFL/dt is not greater than dFL/dt$_{THR}$, control determines that the vehicle is not being refueled and continues in step 312. In step 310, control sets FLAG$_{CL}$. In step 312, control stores the new or most recent FUEL$_{LEVEL}$ into memory and control ends.

Although the dosing agent monitoring control is described in detail above using the fueling station scenario as an example, it is appreciated that the dosing agent monitoring control can monitor other scenarios including, but not limited to, maintenance and/or oil change to determine whether the vehicle is located in a convenient location. For example, the dosing agent monitoring control can monitor vehicle maintenance flags stored in memory and determine that the vehicle is at a convenient location if one or more maintenance related flags are set or reset. Alternatively, the dosing agent control can monitor an oil level or an oil characteristic. For example, if the oil level (OIL$_{LEVEL}$) increases or an oil parameter (OIL$_{PAR}$) (e.g., including, but not limited to, electrical impedance) indicates that an oil change has just occurred, the dosing agent monitoring control can determine that the vehicle is at a convenient location to refill the dosing agent.

Figure 4:
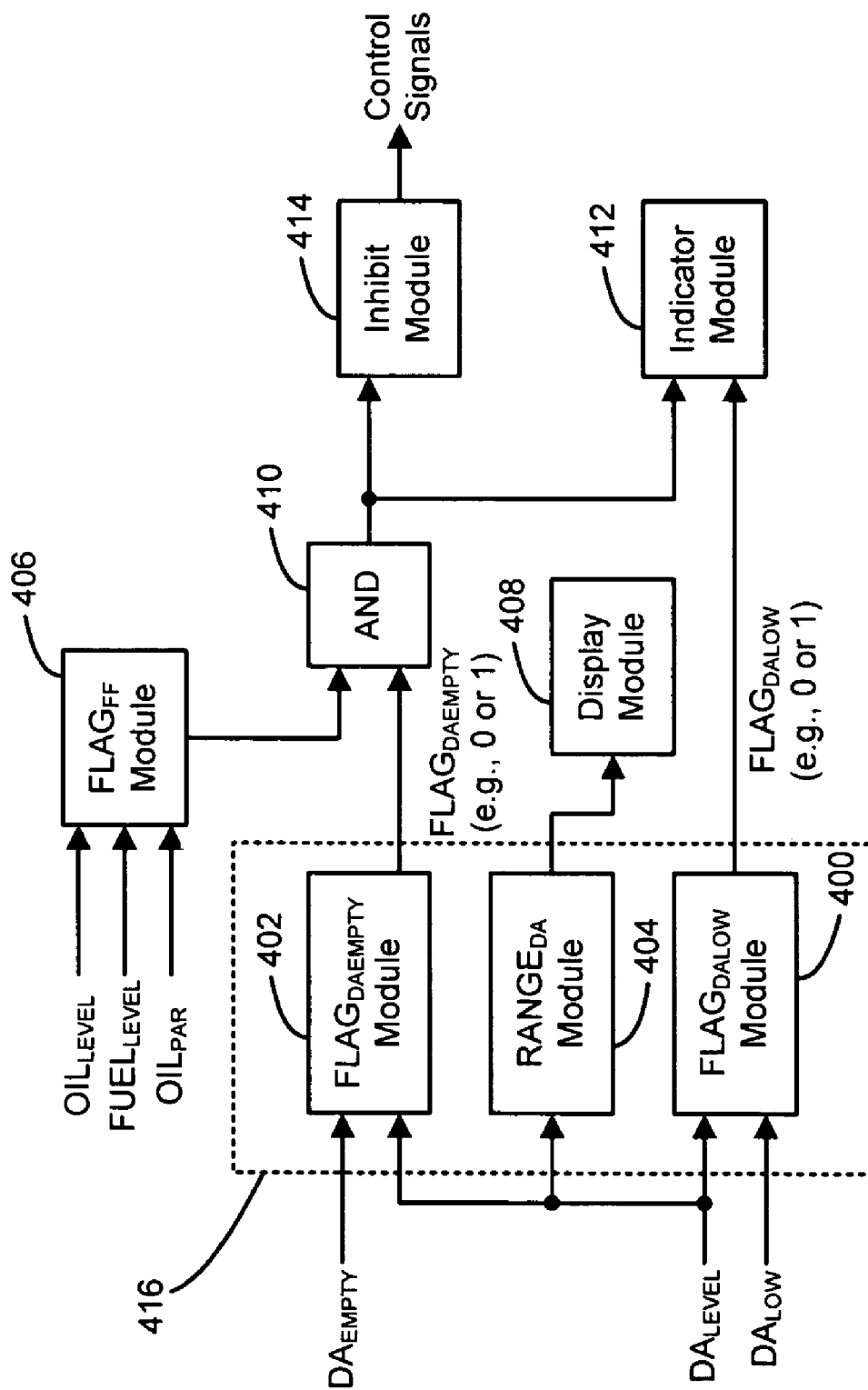
FIG. 4 is a functional block diagram illustrating exemplary modules that execute the dosing agent monitoring control and the fuel level monitoring control.

Referring now to FIG. 4, exemplary modules that execute the dosing agent monitoring control of the present invention will be described in detail. The exemplary modules include a FLAG$_{DALOW}$ module 400, a FLAG$_{EMPTY}$ module 402, a RANGE$_{DA}$ module 404, a FLAG$_{CL}$ module 406, a display module 408, an AND module 410, an indicator module 412 and an inhibit module 414. The FLAG$_{DALOW}$ module 400, the FLAG$_{EMPTY}$ module 402 and the RANGE$_{DA}$ module 404 can be individual modules or can be sub-modules within a larger module 416.

The FLAG$_{DALOW}$ module 400 selectively sets FLAG$_{DALOW}$ based on DA$_{LEVEL}$ and DA$_{LOW}$. Similarly, the FLAG$_{DAEMPTY}$ module 402 selectively sets FLAG$_{DAEMPTY}$ based on DA$_{LEVEL}$ and DA$_{EMPTY}$. The RANGE$_{DA}$ module 404 calculates RANGE$_{DA}$ based on DA$_{LEVEL}$. The FLAG$_{CL}$ module 406 selectively sets FLAG$_{CL}$ based on FUEL$_{LEVEL}$, OIL$_{LEVEL}$ and/or OIL$_{PAR}$. It is also anticipated that FLAG$_{CL}$ can be selectively set based on maintenance flags or any other factor that would indicate the vehicle is at a convenient location. The display module 408 graphically displays RANGE$_{DA}$ to alert the vehicle operator to the remaining distance the vehicle can travel before the dosing agent source is empty or below a desired level.

The AND module 410 generates a signal based on FLAG$_{DAEMPTY}$ and FLAG$_{CL}$. For example, if both FLAG$_{DAEMPTY}$ and FLAG$_{CL}$ are set (e.g., equal to 1) the AND module 410 outputs a signal indicating that the dosing agent is empty and the vehicle is located at a convenient location. The indicator module 412 generates an indication signal (e.g., audible and/or visual) based on FLAG$_{DAEMPTY}$ or FLAG$_{DALOW}$ to alert the vehicle operator to the status of the dosing agent source. The inhibit module 414 selectively disables or limits vehicle operation based on the output of the AND module 410. More specifically, the inhibit module 414 generates control signals that regulate the vehicle in a limp-home mode or disable vehicle operation until the dosing agent source is replenished.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust after-treatment system for a vehicle including a dosing agent that is selectively injected into an exhaust from a dosing agent supply, comprising:
    a first module that determines a level of a dosing agent source;
    a second module that determines whether said vehicle is at a convenient location for replenishing said dosing agent source based on an oil parameter or a maintenance flag, wherein said oil parameter includes an electrical impedance, and wherein said second module determines that said vehicle is at said convenient location (i) when said electrical impedance indicates an oil change has occurred during a period after a vehicle shutdown and before a vehicle restart or (ii) when said maintenance flag indicates that vehicle maintenance has been performed during a period after a vehicle shutdown and before a vehicle restart; and
    a third module that selectively inhibits vehicle operation if said level of said dosing agent source is below a threshold level and said vehicle is at said convenient location.

2. The exhaust after-treatment system of claim 1 wherein said threshold level corresponds to an empty dosing agent source.

3. The exhaust after-treatment system of claim 1 wherein said vehicle operation is inhibited by rendering said vehicle unable to drive.

4. The exhaust after-treatment system of claim 1 wherein said vehicle operation is inhibited by limiting drivability of said vehicle.

5. The exhaust after-treatment system of claim 1 wherein said third module discontinues inhibiting vehicle operation when said dosing agent source is replenished to raise said level above said threshold level.

6. The exhaust after-treatment system of claim 1 further comprising a fourth module that indicates said level of said dosing agent source to alert a vehicle operator.

7. The exhaust after-treatment system of claim 1 further comprising a fourth module that determines a range of said vehicle based on said level, wherein said range indicates a distance that is travelable by said vehicle before said level is below said threshold level.

8. A method of monitoring a dosing agent in an exhaust after-treatment system of a vehicle, comprising:
    determining a level of a dosing agent source;
    determining whether said vehicle is at a convenient location for replenishing said dosing agent source based on an oil parameter or a maintenance flag, wherein said oil parameter includes an electrical impedance, and wherein said vehicle is determined to be at said convenient location (i) when said electrical impedance indicates an oil change has occurred during a period after a vehicle shutdown and before a vehicle restart or (ii) when said maintenance flag indicates that vehicle maintenance has been performed during a period after a vehicle shutdown and before a vehicle restart; and
    selectively inhibiting vehicle operation if said level of said dosing agent source is below a threshold level and said vehicle is at said convenient location.

9. The method of claim 8 wherein said threshold level corresponds to an empty dosing agent source.

10. The method of claim 8 wherein said vehicle operation is inhibited by rendering said vehicle unable to drive.

11. The method of claim 8 wherein said vehicle operation is inhibited by limiting drivability of said vehicle.

12. The method of claim 8 further comprising discontinuing inhibition of said vehicle operation when said dosing agent source is replenished to raise said level above said threshold level.

13. The method of claim 8 further comprising a fourth module that indicates said level of said dosing agent source to alert a vehicle operator.

14. The method of claim 8 further comprising a fourth module that determines a range of said vehicle based on said level, wherein said range indicates a distance that is travelable by said vehicle before said level is below said threshold level.

15. A vehicle that is powered by an internal combustion engine that produces exhaust, comprising:
   a dosing agent source, which stores a dosing agent that is selectively injected into said exhaust; and
   a control module that:
     determines a level of said dosing agent source;
     determines whether said vehicle is at a convenient location for replenishing said dosing agent source based on an oil parameter or a maintenance flag, wherein said oil parameter includes an electrical impedance, and wherein said control module determines that said vehicle is at said convenient location (i) when said electrical impedance indicates an oil change has occurred during a period after a vehicle shutdown and before a vehicle restart or (ii) when said maintenance flag indicates that vehicle maintenance has been performed during a period after a vehicle shutdown and before a vehicle restart; and
     selectively inhibits vehicle operation if said level of said dosing agent source is below a threshold level and said vehicle is at said convenient location.

16. The vehicle of claim 15 wherein said threshold level corresponds to an empty dosing agent source.

17. The vehicle of claim 15 wherein said vehicle operation is inhibited by rendering said vehicle unable to drive.

18. The vehicle of claim 15 wherein said vehicle operation is inhibited by limiting drivability of said vehicle.

19. The vehicle of claim 15 wherein said control module discontinues inhibiting vehicle operation when said dosing agent source is replenished to raise said level above said threshold level.

20. The vehicle of claim 15 wherein said control module indicates said level of said dosing agent source to alert a vehicle operator.

21. The vehicle of claim 15 wherein said control module determines a range of said vehicle based on said level, wherein said range indicates a distance that is travelable by said vehicle before said level is below said threshold level.

* * * * *